Reissued July 30, 1929.

Re. 17,383

UNITED STATES PATENT OFFICE.

LEONARD H. ENGLUND, OF WINONA, MINNESOTA, ASSIGNOR TO ECONOMICS LABORATORY, INC., OF ST. PAUL, MINNESOTA, A CORPORATION OF DELAWARE.

CLEANING COMPOSITION WITH A FLUORESCENT CONCENTRATION INDICATOR.

No Drawing. Original No. 1,584,022, dated May 11, 1926, Serial No. 739,205, filed September 22, 1924. Application for reissue filed April 30, 1928. Serial No. 274,155.

This invention relates to a non-saponaceous cleaning composition, its object being particularly to provide improved non-saponaceous, alkaline cleaning compositions, and, in connection therewith, means indicating to the user the strength of the amount of such composition being used.

My invention relates particularly to the use of tri-sodium phosphate and an ammonium salt, as ammonium chloride or ammonium sulphate, that, dissolved in water, will produce a clear, colorless. or substantially so, non-saponaceous cleaning compound.

In carrying out the purposes of my invention, the ammonium salt, as the ammonium chloride or ammonium sulphate, should preferably bear the relationship by weight in the mixture of two per cent. While ammonium chloride and ammonium sulphate are in themselves neutral salts, when ammonium chloride is brought together with the tri-sodium phosphate in the presence of water, there is liberated ammonium, caustic soda, dibasic sodium phosphate, and sodium chloride, and, when the ammonium sulphate is used it liberates sodium sulphate instead of the sodium chloride. The reaction of these solutions is alkaline.

These ammonium salts, as the ammonium chloride or ammonium sulphate, combined with the tri-sodium phosphate in a mixture wherein the percentage by weight of the salt is two per cent constitutes a non-saponaceous alkaline cleaning composition, which yields a clear and colorless solution having a similar appearance to water.

I have found that by giving this normally clear and colorless solution the properties of reflecting and transmitting light in proportion to the strength of the solution, the user will be caused to instinctively use the proper amount of the solution in proportion to the cleaning operation, the degree of strength being fixed in the user's mind by the reaction to the depth of color or light reflecting properties.

To accomplish the above results I add to the above compound in its dry state, diresorcinolphthalein (tetra-oxyphthalophenonanhydride), or derivatives thereof, in the rate of one to three thousand to one to five thousand parts by weight of diresorcinolphthalein (tetra-oxyphthalophenonanhydride) to the cleaning compound.

This gives to the compound a pinkish color, which, when the compound is mixed with water, turns to a greenish color of a depth and reflecting and light transmitting characteristics proportioned to the amount of mixture placed in the water and indicates to the user, without the necessity of measuring, the strength of the solution.

I am aware that it is old to add to transparent soap fluorescent bodies so that the cake of soap will have a pleasing appearance, but, the objects of my invention are not achieved in a soap thus treated. The soapy or saponaceous characteristics of the soap are in that case the indication of the amount of soap being used. The fluorescent body has in the manufacture of the soap assumed its approximate full depth of color or fluorescent quantities and, when the soap thus treated is used, the contained fluorescent body constitutes no indication of the strength of the amount of soap being used. It is, of course, not necessary that there be such an indication in a compound of a saponaceous character, as the very saponaceous characteristics give the desired indication.

I claim:

1. A new composition of matter, consisting of a non-saponaceous, alkaline cleaning compound that will form a colorless solution upon the adding of water and a fluorescent body added to said compound in its dry state in the substantial proportion of one to three thousand to one to five thousand parts by weight of the fluorescent body to the remainder of the compound.

2. A cleaning composition with a fluorescent concentration indicator, consisting of a granular tri-sodium phosphate, and a granular ammonium salt, which, when mixed, forms a crystal-like mixture. and, when dissolved in water, will produce a colorless, clear, cleaning compound having an alkaline reaction in the presence of water, and a fluorescent body added thereto to act as a concentration indicator for the purpose set forth.

In testimony whereof, I affix my signature.

LEONARD H. ENGLUND.